(12) United States Patent
Wu

(10) Patent No.: US 12,804,400 B2
(45) Date of Patent: Nov. 17, 2026

(54) METHOD AND APPARATUS FOR PROCESSING DOWNLINK DATA, AND TERMINAL

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 904 days.

(21) Appl. No.: 18/058,868

(22) Filed: Nov. 27, 2022

(65) Prior Publication Data

US 2023/0095930 A1 Mar. 30, 2023

Related U.S. Application Data

(63) Continuation of application No. PCT/CN2021/096531, filed on May 27, 2021.

(30) Foreign Application Priority Data

May 29, 2020 (CN) ......................... 202010479263.0

(51) Int. Cl.

| | |
|---|---|
| ***H04W 12/106*** | (2021.01) |
| ***H04W 12/03*** | (2021.01) |
| ***H04W 74/0833*** | (2024.01) |
| ***H04W 74/0836*** | (2024.01) |
| ***H04W 76/19*** | (2018.01) |

(52) U.S. Cl.

CPC ......... *H04W 12/106* (2021.01); *H04W 12/03* (2021.01); *H04W 74/0841* (2013.01); *H04W 76/19* (2018.02); *H04W 74/0833* (2013.01); *H04W 74/0836* (2024.01)

(58) Field of Classification Search

CPC ............... H04W 12/106; H04W 12/03; H04W 74/0841; H04W 74/0833; H04W 74/0836; H04W 76/19

See application file for complete search history.

(56) References Cited

U.S. PATENT DOCUMENTS

| | | | | |
|---|---|---|---|---|
| 10,531,388 | B2 | 1/2020 | Kubota et al. | |
| 11,382,141 | B2 | 7/2022 | Chang et al. | |
| 11,627,625 | B2 * | 4/2023 | Mildh | H04W 68/005 455/458 |
| 2007/0265875 | A1 | 11/2007 | Jiang et al. | |
| 2015/0230204 | A1 * | 8/2015 | Lin | H04W 74/0833 370/312 |
| 2020/0045741 | A1 * | 2/2020 | Ohlsson | H04W 80/02 |
| 2020/0053730 | A1 * | 2/2020 | Hosseini | H04L 5/0044 |
| 2021/0028948 | A1 * | 1/2021 | Gage | H04L 9/14 |

(Continued)

FOREIGN PATENT DOCUMENTS

| | | | |
|---|---|---|---|
| CN | 101765214 | A | 6/2010 |
| CN | 102857920 | A | 1/2013 |

(Continued)

OTHER PUBLICATIONS

First Office Action regarding Chinese Patent Application No. 202010479263.0, dated Dec. 9, 2022. Translation provided by Bohui Intellectual Property.

(Continued)

*Primary Examiner* — Redentor Pasia

(74) *Attorney, Agent, or Firm* — Harness, Dickey & Pierce, P.L.C.

(57) ABSTRACT

A downlink data processing method includes: receiving predetermined downlink data; verifying the downlink data and processing the downlink data based on a verification result.

20 Claims, 3 Drawing Sheets

(56) References Cited

U.S. PATENT DOCUMENTS

| | | | | |
|---|---|---|---|---|
| 2021/0211251 | A1* | 7/2021 | Byun | H04L 5/0053 |
| 2021/0307055 | A1* | 9/2021 | Tsai | H04W 72/23 |
| 2021/0329712 | A1* | 10/2021 | Pham Van | H04W 12/106 |
| 2021/0337625 | A1* | 10/2021 | Tsai | H04W 76/19 |
| 2021/0410191 | A1* | 12/2021 | Wu | H04W 74/0833 |
| 2022/0104275 | A1 | 3/2022 | Bao et al. | |
| 2022/0124868 | A1* | 4/2022 | Kim | H04W 76/19 |
| 2022/0167239 | A1* | 5/2022 | Kim | H04W 36/185 |
| 2022/0256587 | A1* | 8/2022 | Fujishiro | H04W 72/23 |
| 2022/0264638 | A1* | 8/2022 | Qiu | H04W 72/0446 |
| 2023/0013851 | A1* | 1/2023 | Lin | H04L 1/16 |
| 2023/0020533 | A1* | 1/2023 | Wang | H04W 12/108 |

FOREIGN PATENT DOCUMENTS

| | | | |
|---|---|---|---|
| CN | 110291829 | A | 9/2019 |
| CN | 111417214 | A | 7/2020 |
| WO | WO-2018166331 | A1 | 9/2018 |
| WO | WO-2019184483 | A1 | 10/2019 |

OTHER PUBLICATIONS

Second Office Action regarding Chinese Patent Application No. 202010479263.0, dated May 17, 2023. Translation provided by Bohui Intellectual Property.

Third Office Action regarding Chinese Patent Application No. 202010479263.0, dated Aug. 18, 2023. Translation provided by Bohui Intellectual Property.

Extended European Search Report regarding European Patent Application No. 21814352.7, dated Sep. 1, 2023.

International Search Report and Written Opinion of the International Searching Authority regarding International Patent Application No. PCT/CN2021/096531, dated Aug. 4, 2021. Translation provided by Bohui Intellectual Property.

* cited by examiner

METHOD AND APPARATUS FOR PROCESSING DOWNLINK DATA, AND TERMINAL

CROSS-REFERENCE TO RELATED APPLICATIONS

This application is a Bypass Continuation Application of PCT/CN2021/096531 filed on May 27, 2021, which claims priority to Chinese Patent Application No. 202010479263.0 filed on May 29, 2020, which are incorporated herein by reference in their entirety.

TECHNICAL FIELD

The present application relates to the field of communications more particularly to a downlink data processing method and apparatus, and a terminal.

BACKGROUND

Usually, based on a resource configured by a network side, in a case that a user equipment (UE) is in an idle state or an inactive state, the UE may directly send small data (SDT) to the network side.

For example, small data is sent to the network side through a message 3 (Msg3) of a 4-step random access process of initial access, or small data is sent to the network side through a message A (MsgA) of a 2-step random access process of initial access, or a dedicated uplink physical uplink shared information (PUSCH) resource (for example, pre-configured PUSCH; or, a PUR (Preallocated Uplink Resource)) configured in a network.

Correspondingly, the network side may directly send small data to the UE in a corresponding method. For example, the network side directly sends small data to the UE through a message 4 (Msg4) of a 4-step random access process of initial access, or the network side directly sends small data to the UE through a message B (MsgB) of a 2-step random access process of initial access, or the network side directly sends small data to the UE through a downlink feedback resource corresponding to a dedicated uplink resource configured by a network.

In a case that the network side sends data to the UE in the foregoing scenarios, no effective solution has been provided for how to ensure the security of the data.

SUMMARY

According to a first aspect, a downlink data processing method is provided, applied to a terminal. The method includes: receiving predetermined downlink data; and verifying the downlink data and processing the downlink data based on a verification result.

According to a second aspect, a downlink data processing apparatus is provided, including: a receiving module, configured to receive predetermined downlink data; and a processing module, configured to verify the downlink data and process the downlink data based on a verification result.

According to a third aspect, a terminal is provided, including a memory, a processor, and a program or an instruction stored in the memory and executable on the processor, where when the program or instruction is executed by the processor, the steps of the method according to the first aspect are implemented.

According to a fourth aspect, a non-transitory readable storage medium is provided, storing a program or an instruction, where when the program or the instruction is executed by a processor, the steps of the methods according to the first aspect are implemented.

According to a fifth aspect, a chip is provided. The chip includes a processor and a communication interface. The communication interface is coupled to the processor, and the processor is configured to run a program or instructions of a terminal to implement the method according to the first aspect.

BRIEF DESCRIPTION OF THE DRAWINGS

Accompanying drawings described herein are used for providing further understanding about the present disclosure, and constitute one portion of the present disclosure. Exemplary embodiments of the present disclosure and descriptions thereof are used for explaining the present disclosure, and do not constitute an inappropriate limitation on the present disclosure. In the drawings.

DETAILED DESCRIPTION

The following clearly describes the technical solutions in the embodiments of this application with reference to the accompanying drawings in the embodiments of this application. Apparently, the described embodiments are some rather than all of the embodiments of the present application. All other embodiments obtained by a person of ordinary skill in the art based on the embodiments of the present application shall fall within the protection scope of the present application.

It is worth pointing out that the technologies described in the embodiments of this application are not limited to the Long Term Evolution (LTE)/LTE-advanced (LTE-A) systems, and may also be used in other radio communication systems, such as code division multiple access (CDMA), time division multiple access (TDMA), and frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technologies described can be used for both the foregoing systems and radio technologies, as well as other systems and radio technologies. However, the following description describes a new radio (NR) system for example purposes, and uses NR terminology in most of the following description, although these technologies can also be applied to applications other than NR system applications, such as a 6th generation (6G) communication system.

Figure 1:
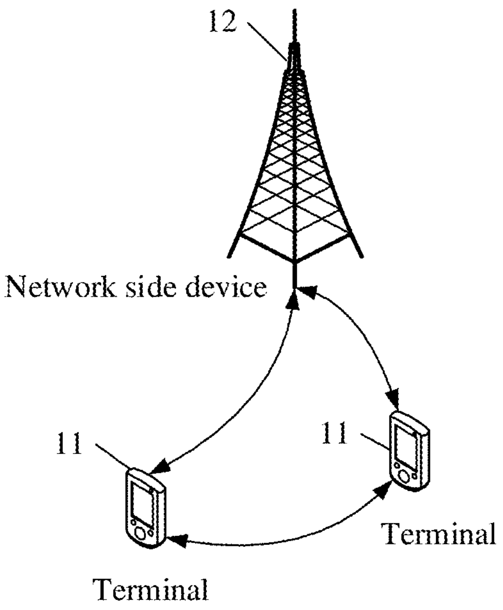
FIG. 1 is a block diagram of an applicable radio communication system according to an embodiment of this application.

FIG. 1 is a block diagram of an applicable radio communication system according to an embodiment of this application. The radio communication system includes a terminal 11 and a network side device 12. The terminal 11 may also be referred to as a terminal device or a user terminal (UE). The terminal 11 may be terminal side devices such as a mobile phone, a tablet computer (Tablet Personal Computer), a laptop computer or referred to as a notebook computer, a personal digital assistant (PDA), a palm computer, a netbook, an ultra-mobile personal computer (UMPC), a mobile Internet device (MID), a wearable device, or in-vehicle equipment (VUE), and a pedestrian terminal (PUE). The wearable device includes: a bracelet, a headphone, glasses, and the like. It should be noted that the embodiments of this application are not limited to the specific type of the terminal 11. The network side device 12 may be a base station or a core network, where the base station may be referred to as a node B, an evolved node B, an access point, a base transceiver station (BTS), a radio base station, a radio transceiver, a basic service set (BSS), an extended service set (ESS), a B node, an evolved B node (eNB), a home B node, a home evolved B node, a WLAN access point, a WiFi node, a transmitting receiving point (TRP) or other suitable term in the field, as long as the same technical effect is achieved, the base station is not limited to specific technical vocabularies, and it should be noted that, in the embodiments of this application, a base station in the NR system is used as an example only and the specific type of the base station is not limited.

The downlink data processing method provided in the embodiments of this application is described in detail below by using specific embodiments and application scenarios with reference to the accompanying drawings.

Figure 2:
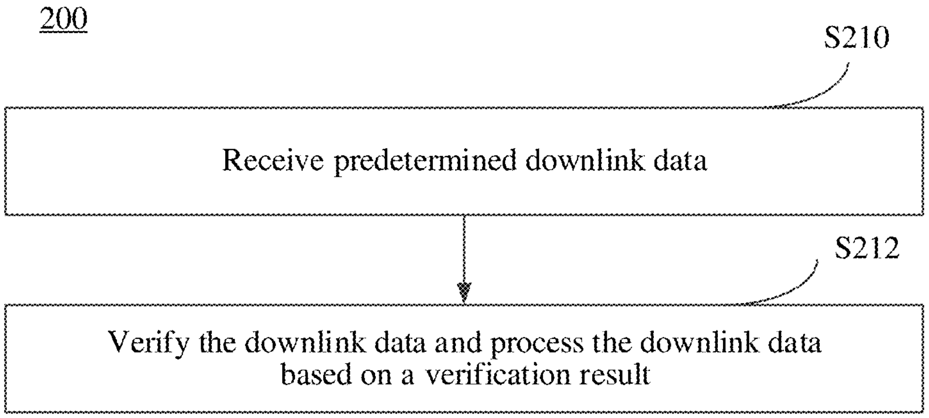
FIG. 2 is a schematic flowchart of a downlink data processing method according to an embodiment of this application.

FIG. 2 is a schematic flowchart of a downlink data processing method according to an embodiment of this application. A method 200 may be performed by a terminal. In other words, the method may be performed by software or hardware installed on the terminal. As shown in FIG. 2, the method may include the following steps.

S210: Receive predetermined downlink data.

S212: Verify the downlink data and process the downlink data based on a verification result.

In this embodiment of this application, in a case that the terminal receives predetermined downlink data, the terminal verifies the downlink data and processes the downlink data based on a verification result, so that the security of the data can be ensured.

In a possible implementation, the predetermined downlink data may include any of the following:

(1) a Msg4 in a 4-step random access process; for example, data carried in a Msg4 sent by a network side in a 4-step random access process of initial access;

(2) a message B MsgB in a 2-step random access process; for example, data carried in a MsgB sent by a network side in a 2-step random access process of initial access; or (3) downlink data transmitted on a predetermined downlink feedback resource, where the predetermined downlink feedback resource corresponds to a dedicated uplink resource configured by a network.

In the foregoing possible implementations, the security of receiving (or transmitting) data sent by the network side to the UE through the "Msg4 in a 4-step random access process of initial access", the "MsgB in a 2-step random access process of initial access", or the "downlink feedback resource corresponding to a dedicated uplink resource configured by a network" can be ensured.

In a possible implementation, current status of the terminal may include the following: an idle state or an inactive (may also be referred to as inactivated) state. In the possible implementation, in a case that the terminal in the idle state or the inactive state receives data directly sent by the network side, the data is verified and the data is processed based on a verification result, so that the security of the data is ensured.

In a possible implementation, a type of predetermined downlink data may include at least one of the following:

(1) data radio bearer (DRB) data; or (2) signaling radio bearer (SRB) data.

In other words, in the possible implementation, the predetermined downlink data may include DRB data and/or SRB data.

In a possible implementation, S212 may include at least one of the following:

(1) performing contention resolution verification on the downlink data and processing the downlink data based on a contention resolution verification result; or (2) in a case that the downlink data includes both SRB data and DRB data, performing verification processing on the SRB data or the DRB data in the downlink data and processing the downlink data based on a verification processing result.

In a possible implementation, during the contention resolution verification on the downlink data, the contention resolution verification may be performed using contention resolution data included in the downlink data.

For example, in a 2-step random access process, for a terminal in a connected state, MsgB contention resolution verification thereof may include: downlink transmission scheduled by cell-radio network temporary identifier (C-RNTI) physical downlink control channel (PDCCH) includes an absolute timing advance command media access control layer control element (MAC CE). For a terminal in an idle or inactive state, MsgB contention resolution verification may include: UE contention resolution identity information in a decoding success response (successRAR) of the MsgB matches first 48 bits of an uplink common control channel (UL CCCH) service data unit (SDU) sent thereby.

In a 4-step random access process, for CONNECTED UE, Msg4 contention resolution verification may include: uplink transmission scheduled by C-RNTI PDCCH is a new transmission. For IDLE UE or INACTIVE UE, Msg4 contention resolution verification may include: UE contention resolution identity information in received UE contention resolution identity MAC CE matches first 48 bits of a UL CCCH SDU sent by the terminal.

In the foregoing possible implementation, optionally, after the contention resolution verification of the downlink data succeeds, data content in the downlink data is processed by a high-level protocol entity of the terminal; in a case that the contention resolution verification of the downlink data fails, current failure is ignored. Through the possible implementation, the security of receiving of the downlink data can be ensured.

For example, in a possible implementation, after the contention resolution verification of the downlink data succeeds, the data content of the downlink data is sent to the high-level protocol entity; and the high-level protocol entity processes the data content in the downlink data.

For example, the Msg4 or the MsgB includes data of contention resolution MAC CE and DRB-1 (or LCH-1). The terminal first verifies the contention resolution MAC CE. After verification of the contention resolution MAC CE succeeds, the terminal transfers DRB-1 data (for example MAC SDU-1) corresponding to the contention resolution MAC CE to a high-level protocol entity for processing, where the high-level protocol entity may be a radio link control (RLC) layer entity and/or a packet data convergence protocol (PDCP) layer entity.

Alternatively, in another possible implementation, the data content of the downlink data may be sent to the high-level protocol entity before the contention resolution verification is performed on the downlink data, and the high-level protocol entity does not immediately process the data content of the downlink data after receiving the downlink data, but instead, the high-level protocol entity processes the data content of the downlink data after the contention resolution verification performed on the downlink data succeeds.

For example, the Msg4 or the MsgB includes data of contention resolution MAC CE and DRB-1 (or LCH-1). Before the contention resolution verification is completed, the UE allows the DRB-1 data to be sent to a high-level protocol entity (for example, an RLC and/or a PDCP), but the high-level protocol entity does not process the data packet. In a case that the contention resolution verification succeeds, the high-level protocol entity (for example, the RLC and/or the PDCP) processes the received data content.

Optionally, the high-level protocol entity processing the received data content may include at least one of the following:

(1) performing integrity protection verification on the data content of the downlink data; for example, verifying a MAC-I at a tail of a PDCP protocol data unit (PDU for short) packet;

(2) decrypting the data content of the downlink data; for example, decrypting content in the PDCP PDU; or (3) decompressing the data content of the downlink data; for example, performing a robust header compression (ROHC) decompression operation on the content in the PDCP PDU.

In a possible implementation, the performing contention resolution verification on the downlink data and processing the downlink data based on a contention resolution verification result may include: sending data content of the downlink data to a high-level protocol entity for processing and performing the contention resolution verification on the downlink data; and in a case that the high-level protocol entity of the terminal fails to process the data content of the downlink data and the contention resolution verification performed on the downlink data also fails, ignoring a current failure result. In the possible implementation, the UE allows the received data to be processed before the contention resolution. For example, the high-level protocol entity may process the data content after receiving the data content of the downlink data. In a case that processing of the received data fails and the contention resolution verification also fails, the UE ignores a current failure result.

In a possible implementation, the high-level protocol entity processing the received data content may include at least one of the following:

(1) performing integrity protection verification on the data content of the downlink data; for example, verifying a MAC-I at a tail of a PDCP protocol data unit (PDU for short) packet;

(2) decrypting the data content of the downlink data; for example, decrypting content in the PDCP PDU; or (3) decompressing the data content of the downlink data; for example, performing a robust header compression (ROHC) decompression operation on the content in the PDCP PDU.

Correspondingly, in a possible implementation, the failing to process the data content of the downlink data may include at least one of the following:

(1) failing to perform integrity protection verification on the data content of the downlink data;

(2) failing to decrypt the data content of the downlink data; or (3) failing to decompress the data content of the downlink data.

In a possible implementation, the ignoring a current failure result may include at least one of the following:

(1) discarding a data packet of the downlink data; or (2) skipping performing a failure recovery process. For example, usually, for a terminal on which the integrity protection verification fails, the failure recovery process is to enter the IDLE state, and in the possible implementation, the UE in the INACTIVE state does not enter the IDLE state.

In a possible implementation, in a case that the downlink data includes both SRB data and DRB data, the processing the SRB data or the DRB data in the downlink data and processing the downlink data based on a verification processing result includes: processing the DRB data in the downlink data in a case that the verification processing on the SRB data or the DRB data in the downlink data succeeds.

In a possible implementation, first verification processing is performed on the SRB data, and after the verification processing on the SRB data succeeds, verification processing is performed on the DRB data. Alternatively, first verification is performed on the DRB data first, and after the verification processing on the DRB data succeeds, verification is performed on the DRB data. Therefore, in the possible implementation, the processing the DRB data in the downlink data in a case that the verification processing on the SRB data or the DRB data in the downlink data succeeds includes:

in a case that verification processing on a first data type data in the downlink data succeeds, performing verification processing on a second data type data in the downlink data, where the first data type data is the SRB data and the second data type data is the DRB data; or, the first data type data is the DRB data and the second data type data is the SRB data.

In the possible implementations, optionally, in a case that the verification processing on the SRB data or the DRB data in the downlink data fails, a failure recovery process is performed. That is, in the possible implementations, in a case that the verification processing on the SRB data or the verification on the DRB data fails, the failure recovery process is performed without performing verification processing on data of another data type.

Optionally, the verification processing performed on the first data type data includes at least one of the following:

(1) performing integrity protection verification on the first data type data; or (2) decrypting the first data type data.

Correspondingly, in a possible implementation, the failing to perform verification processing on the first data type data includes at least one of the following:

(1) failing to perform integrity protection verification on the first data type data; or (2) failing to decrypt the first data type data.

In the possible implementations, performing a failure recovery process may include at least one of the following:

(1) the terminal enters to the IDLE state; for example, the terminal in the INACTIVE state enters to the IDLE state;
(2) discarding a data packet of the first data type data on which the discarding processing fails;
(3) discarding a data packet of the downlink data;
(4) triggering a cell selection or reselection process;
(5) triggering a connection re-establishment process or a connection establishment process; or
(6) falling back context information or configuration information saved by the terminal to a preset state, where the preset state is a state before uplink data corresponding to the downlink data is sent. For example, a terminal in the INACTIVE state generates a new security secret key based on configuration information (for example, an NCC) and uses the security secret key to send data in a Msg3 or a MsgA. In a case that processing of the SRB data fails, the terminal rolls back the security configuration (for example, the NCC) thereof to a state before the Msg3 or the MsgA data is sent. Then, during sending of data next time, the terminal still uses the configuration information (for example, the NCC) to generate a security secret key and send the data.

In the foregoing method provided in this application, in a case that the network side sends data to the UE through the "Msg4 in a 4-step random access process of initial access" or the "MsgB in a 2-step random access process of initial access", or the "downlink feedback resource corresponding to a dedicated uplink resource configured by a network", the UE may receive the data only after performing security verification on the network, so that the security of data reception is ensured.

It should be noted that in the downlink data processing method provided in this embodiment of this application, an execution body may be a downlink data processing apparatus, or a control module configured to perform a downlink data processing method in the downlink data processing apparatus. In an embodiment of this application, for example, the downlink data processing apparatus performs the downlink data processing method, to describe the downlink data processing apparatus provided in this embodiment of this application.

Figure 3:
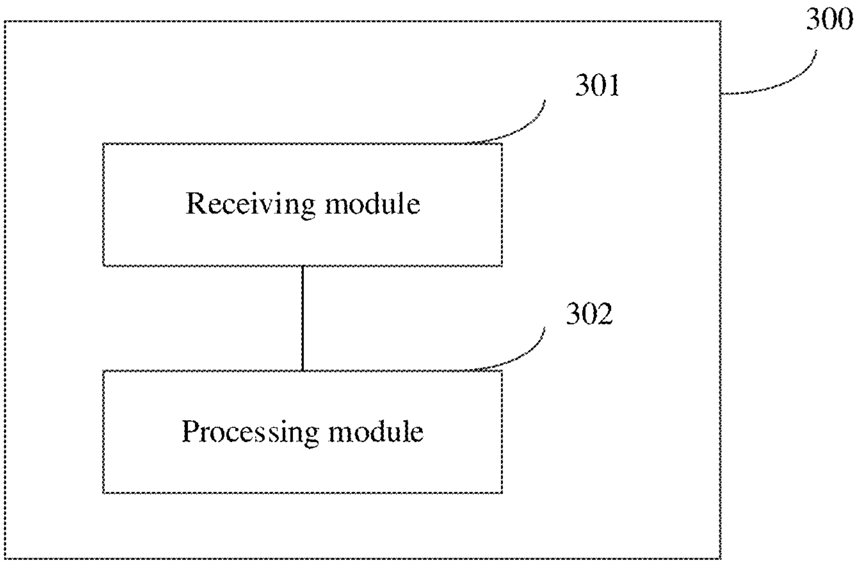
FIG. 3 is another schematic structural diagram of a downlink data processing apparatus according to an embodiment of this application.

FIG. 3 is a schematic structural diagram of a downlink data processing apparatus according to an embodiment of this application. As shown in FIG. 3, a downlink data processing apparatus 300 may include: a receiving module 301, configured to receive predetermined downlink data; and a processing module 302, configured to verify the downlink data and process the downlink data based on a verification result.

In a possible implementation, the downlink data includes any of the following: a message 4 Msg4 in a 4-step random access process; a message B MsgB in a 2-step random access process; or downlink data transmitted on a predetermined downlink feedback resource, where the predetermined downlink feedback resource corresponds to a dedicated uplink resource configured by a network.

In a possible implementation, a data type of the downlink data includes at least one of the following: data radio bearer DRB data; or signaling radio bearer SRB data.

In a possible implementation, status of the terminal includes any of the following: an idle state; or an inactive state.

In a possible implementation, the processing module 302 performs verification on the downlink data, and processing the downlink data based on a verification result, including at least one of the following: performing contention resolution verification on the downlink data, and processing the downlink data based on the contention resolution verification result; or in a case that the downlink data includes both SRB data and DRB data, verification processing is performed on the SRB data or DRB data in the downlink data, and the downlink data is processed based on the verification processing result.

In a possible implementation, the processing module 302 performing contention resolution verification on the downlink data and processing the downlink data based on a contention resolution verification result includes: in a case that the contention resolution verification on the downlink data succeeds, processing data content of the downlink data by a high-level protocol entity of the terminal; and in a case that the contention resolution verification on the downlink data fails, ignoring current failure.

In a possible implementation, the apparatus further includes: a transmission module, configured to send the data content of the downlink data to the high-level protocol entity after the contention resolution verification performed on the downlink data succeeds; or send the data content of the downlink data to the high-level protocol entity before the contention resolution verification is performed on the downlink data.

In a possible implementation, the processing module performing contention resolution verification on the downlink data and processing the downlink data based on a contention resolution verification result includes: sending data content of the downlink data to a high-level protocol entity for processing and performing the contention resolution verification on the downlink data; and in a case that the high-level protocol entity of the terminal fails to process the data content of the downlink data and the contention resolution verification performed on the downlink data also fails, ignoring a current failure result.

In a possible implementation, the processing module 302 ignoring a current failure result includes at least one of the following:

discarding a data packet of the downlink data on which the discarding processing fails; or
skipping performing a failure recovery process.

In a possible implementation, the processing module 302 processing the data content of the downlink data includes at least one of the following:

performing integrity protection verification on the data content of the downlink data;
decrypting the data content of the downlink data; or
decompressing the data content of the downlink data.

In a possible implementation, the processing module 302 failing to process the data content of the downlink data includes at least one of the following:

failing to perform integrity protection verification on the data content of the downlink data;
failing to decrypt the data content of the downlink data; or
failing to decompress the data content of the downlink data.

In a possible implementation, the processing module 302 performing the contention resolution verification on the downlink data includes: performing the contention resolution verification by using contention resolution data included in the downlink data.

In a possible implementation, the processing module 302 performing verification processing on the SRB data or the DRB data in the downlink data and performing verification processing on the downlink data based on a verification processing result includes: in a case that verification processing on a first data type data in the downlink data succeeds, performing verification processing on a second data type data in the downlink data, where the first data type data is the SRB data and the second data type data is the DRB data; or, the first data type data is the DRB data and the second data type data is the SRB data.

In a possible implementation, the processing module 302 is further configured to perform a failure recovery process in a case that the verification processing on the first data type data in the downlink data fails.

In a possible implementation, the processing module 302 performing verification processing on the first data type data includes at least one of the following: performing integrity protection verification on the first data type data; or decrypting the first data type data.

In a possible implementation, the processing module 302 failing to process the first data type data includes at least one of the following: failing to perform integrity protection verification on the first data type data; or failing to decrypt the first data type data.

In a possible implementation, the processing module 302 performing a failure recovery process includes at least one of the following:

- setting the terminal to the IDLE state;
- discarding a data packet of the first data type data on which the discarding processing fails;
- discarding a data packet of the downlink data;
- triggering a cell selection or reselection process;
- triggering a connection re-establishment process or a connection establishment process; or
- falling back context information or configuration information saved by the terminal to a preset state, where the preset state is a state before uplink data corresponding to the downlink data is sent.

The downlink data processing apparatus in this embodiment of this application may be an apparatus, or may be a component, an integrated circuit, or a chip in a terminal. The apparatus may be a mobile terminal or a non-mobile terminal. Exemplarily, the mobile terminal may include, but is not limited to, the types of the terminal 11 listed above, and the non-mobile terminal may be a server, a network attached storage (NAS), a personal computer (PC), a television (TV), an automatic teller machine, a self-service machine, and the like, which are not specifically limited in this embodiment of this application.

The downlink data processing apparatus in this embodiment of this application may be an apparatus having an operating system. The operating system may be an Android operating system, may be an ios operating system, or may be another possible operating system, which is not specifically limited in this embodiment of this application.

The downlink data processing apparatus provided in this embodiment of this application can implement the processes implemented in the method embodiment of FIG. 2, and achieve the same technical effect, which are not repeated herein.

Figure 4:
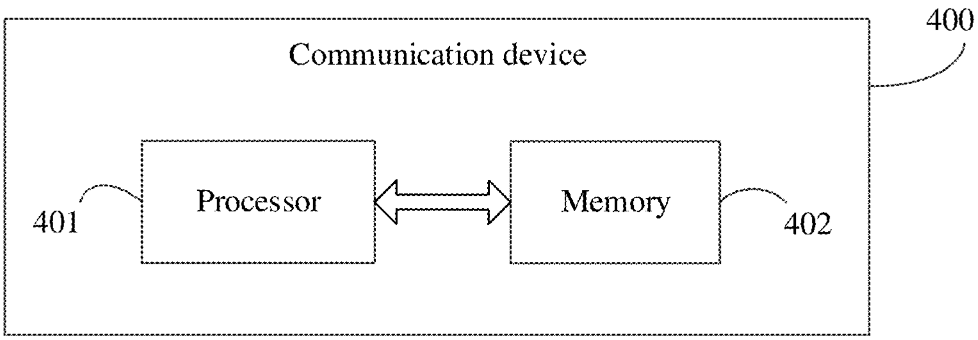
FIG. 4 is a schematic structural diagram of a communication device according to an embodiment of this application.

Optionally, as shown in FIG. 4, an embodiment of this application further provides a communication device 400, including a processor 401, a memory 402, a program or instructions stored on the memory 402 and capable of being run on the processor 401. For example, in a case that the communication device 400 is a terminal, the program or the instructions, when executed by the processor 401, implement the processes of the foregoing downlink data processing method embodiment, and in addition, the same technical effect can be achieved, which are not repeated herein in order to avoid duplication.

Figure 5:
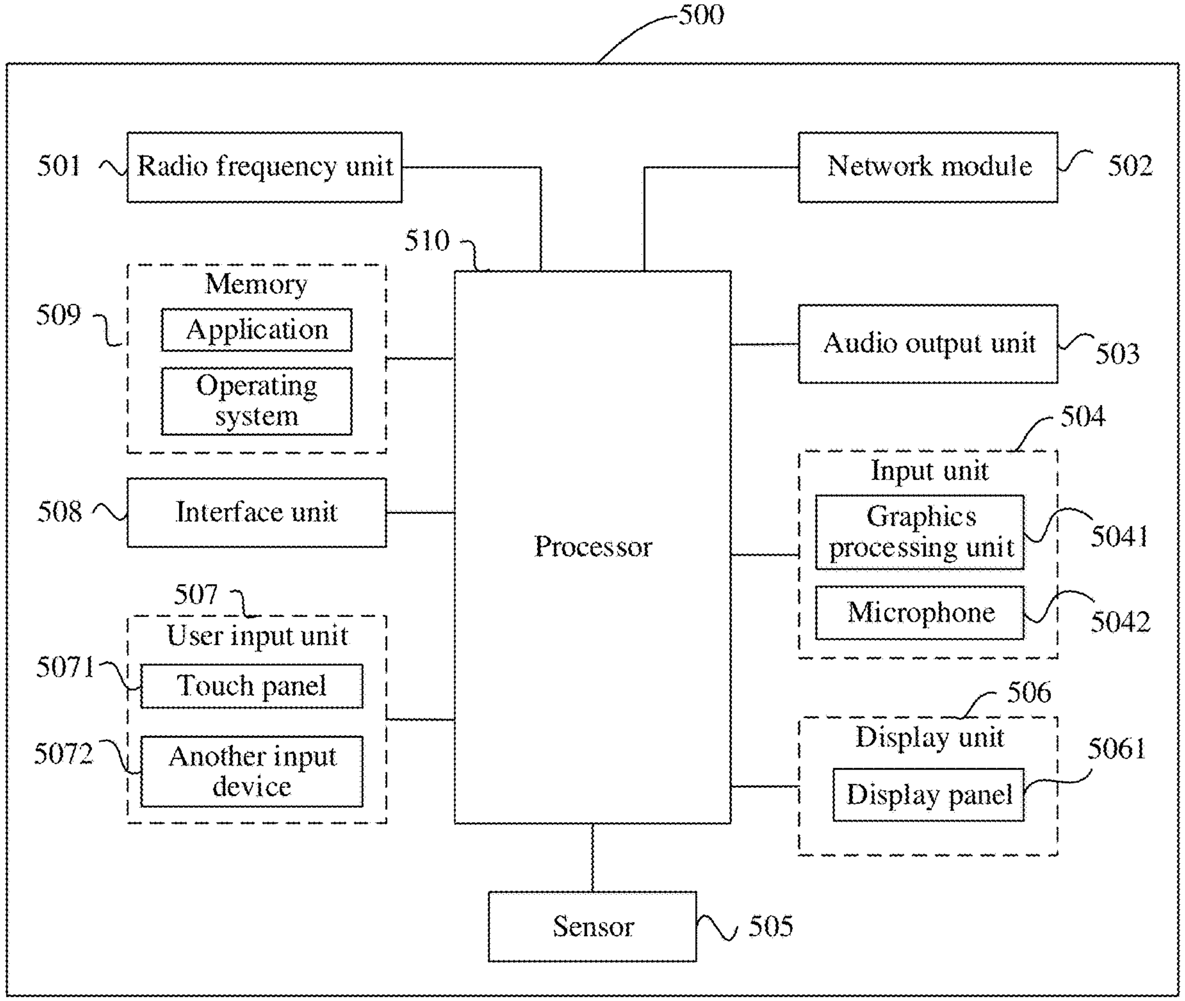
FIG. 5 is a schematic diagram of a hardware structure of a terminal according to an embodiment of this application.

FIG. 5 is a schematic diagram of a hardware structure of a terminal for implementing an embodiment of this application.

The terminal 500 includes, but is not limited to, components such as a radio frequency unit 501, a network module 502, an audio output unit 503, an input unit 504, a sensor 505, a display unit 506, a user input unit 507, an interface unit 508, a memory 509, and a processor 510.

A person skilled in the art may understand that the terminal 500 may further include the power supply (such as a battery) for supplying power to the components. The power supply may be logically connected to the processor 510 by a power management system, thereby implementing functions such as charging, discharging, and power consumption management by using the power management system. The terminal structure shown in FIG. 5 does not constitute a limitation on the terminal, and the terminal may include more or fewer components than shown, or combine some components, or have different component arrangements. Details are not described herein again.

It should be understood that, in this embodiment of this application, the input unit 504 may include a graphics processing unit (GPU) 5041 and a microphone 5042. The graphics processing unit 5041 processes image data of a still picture or a video obtained by an image capture apparatus (such as a camera) in a video capture mode or an image capture mode. The display unit 506 may include a display panel 5061. The display panel 5061 may be configured in a form of a liquid crystal display, an organic light emitting diode, or the like. The user input unit 507 includes a touch panel 5071 and another input device 5072. The touch panel 5071 is also referred to as a touch screen. The touch panel 5071 may include a touch detection apparatus and a touch controller. The another input device 5072 may include, but is not limited to, a physical keyboard, a function key (such as a volume control key, a switch key, or the like), a trackball, a mouse, and an operating lever, which is not described in detail herein.

In this embodiment of this application, the radio frequency unit 501 receives downlink data from a network side device to then send the downlink data to the processor 510 for processing; and in addition, sends uplink data to the network side device. Generally, the radio frequency unit 501 includes, but is not limited to, an antenna, at least one amplifier, a transceiver, a coupler, a low noise amplifier, a duplexer, or the like.

The memory 509 may be configured to store a software program or instruction and various data. The memory 509 may mainly include a program or instruction storage area and a data storage area. The program or instruction storage area may store an operating system, an application program or an instruction required by at least one function (for example, a sound playback function and an image display function), and the like. In addition, the memory 509 may include a high speed random access memory, and may also include a non-volatile memory. The non-volatile memory may be a read-only memory (ROM), a programmable ROM (PROM), an erasable programmable read-only memory (Erasable PROM, EPROM), an electrically EPROM (EEPROM), or a flash memory. For example, at least one magnetic disk storage device, a flash memory, or another volatile solid-state storage device.

The processor 510 may include one or more processing units. Optionally, the processor 510 may integrate an application processor and a modem processor. The application processor mainly processes an operating system, a user interface, an application program or an instruction, and the like. The modem processor such as a baseband processor mainly processes wireless communication. It may be understood that, the modem processor may alternatively not be integrated in the processor 510.

The radio frequency unit 501 (write if any) is configured to receive predetermined downlink data; and the processor 510 is configured to verify the downlink data and process the downlink data based on a verification result.

Optionally, the downlink data includes any of the following:

a message 4 Msg4 in a 4-step random access process;

a message B MsgB in a 2-step random access process; or downlink data transmitted on a predetermined downlink feedback resource, where the predetermined downlink feedback resource corresponds to a dedicated uplink resource configured by a network.

Optionally, a data type of the downlink data includes at least one of the following:

data radio bearer DRB data; or signaling radio bearer SRB data.

Optionally, status of the terminal includes any of the following:

an idle state; or an inactive state.

Optionally, the processor 510 performing verification processing on the downlink data and processing the downlink data based on a verification result includes at least one of the following:

performing contention resolution verification on the downlink data and processing the downlink data based on a contention resolution verification result; or in a case that the downlink data includes both SRB data and DRB data, performing verification processing on the SRB data or the DRB data in the downlink data and processing the downlink data based on a verification processing result.

Optionally, the processor 510 performing contention resolution verification on the downlink data and processing the downlink data based on a contention resolution verification result includes:

in a case that the contention resolution verification of the downlink data succeeds, processing data content of the downlink data by a high-level protocol entity of the terminal; or in a case that the contention resolution verification of the downlink data fails, ignoring a current failure.

Optionally, before the processor 510 processes the data content of the downlink data by the high-level protocol entity of the terminal, the method further includes:

after the contention resolution verification of the downlink data succeeds, sending the data content of the downlink data to the high-level protocol entity; or before the performing the contention resolution verification on the downlink data, sending the data content of the downlink data to the high-level protocol entity.

Optionally, the processor 510 performing contention resolution verification on the downlink data and processing the downlink data based on a contention resolution verification result includes: sending data content of the downlink data to a high-level protocol entity for processing and performing the contention resolution verification on the downlink data; and in a case that the high-level protocol entity of the terminal fails to process the data content of the downlink data and the contention resolution verification performed on the downlink data also fails, ignoring a current failure result.

Optionally, the processor 510 ignoring a current failure result includes at least one of the following:

discarding a data packet of the downlink data on which the discarding processing fails; or skipping performing a failure recovery process.

Optionally, the processor 510 processing the data content of the downlink data includes at least one of the following:

performing integrity protection verification on the data content of the downlink data;

decrypting the data content of the downlink data; or decompressing the data content of the downlink data.

Optionally, the processor 510 failing to process the data content of the downlink data includes at least one of the following:

failing to perform integrity protection verification on the data content of the downlink data;

failing to decrypt the data content of the downlink data; or failing to decompress the data content of the downlink data.

Optionally, the processor 510 performing contention resolution verification on the downlink data includes:

performing the contention resolution verification by using contention resolution data included in the downlink data.

Optionally, the processor 510 performing verification processing on the SRB data or DRB data in the downlink data and processing the downlink data based on a verification processing result includes:

in a case that verification processing on a first data type data in the downlink data succeeds, performing verification processing on a second data type data in the downlink data, where the first data type data is the SRB data and the second data type data is the DRB data; or, the first data type data is the DRB data and the second data type data is the SRB data.

Optionally, the processor 510 is further configured to perform a failure recovery process in a case that the verification processing on the first data type data in the downlink data fails.

Optionally, the processor 510 performing verification processing on the first data type data includes at least one of the following:

performing integrity protection verification on the first data type data; or decrypting the first data type data.

Optionally, the processor 510 failing to perform verification processing on the first data type data includes at least one of the following:

failing to perform integrity protection verification on the first data type data; or failing to decrypt the first data type data.

Optionally, the processor 510 performing a failure recovery process includes at least one of the following:

the terminal enters to the IDLE state;

discarding a data packet of the first data type data on which the discarding processing fails;

discarding a data packet of the downlink data;

triggering a cell selection or reselection process;

triggering a connection re-establishment process or a connection establishment process; or falling back context information or configuration information saved by the terminal to a preset state, where the preset state is a state before uplink data corresponding to the downlink data is sent.

In the foregoing terminal provided in this application, in a case that the network side sends data to the terminal through the "Msg4 in a 4-step random access process of initial access" or the "MsgB in a 2-step random access process of initial access", or the "downlink feedback resource corresponding to a dedicated uplink resource configured by a network", the terminal may receive the data only after performing security verification on the network, so that the security of data reception is ensured.

An embodiment of this application further provides a non-transitory readable storage medium. The non-transitory readable storage medium stores a program or instructions. The program or instructions, when executed by a processor, cause the processor to perform the processes of the foregoing downlink data processing method embodiment, and in addition, the same technical effect can be achieved, which are not repeated herein in order to avoid duplication.

The processor is the processor in the terminal described in the foregoing embodiment. The non-transitory readable storage medium includes a non-transitory computer-readable storage medium, such as computer read-only memory (ROM), a random access memory (RAM), a disk, an optical disk, or the like.

An embodiment of this application further provides a chip. The chip includes a processor and a communication interface. The communication interface is coupled to the processor. The processor is configured to run a terminal program or instructions to implement the processes of the foregoing downlink data processing method embodiments, and in addition, the same technical effect can be achieved, which are not repeated herein in order to avoid duplication.

It should be understood that the chip mentioned in this embodiment of this application may also be referred to as a system-grade chip, a system chip, a chip system, or a system-on-a-chip. It may be understood that the embodiments described in the embodiments of this application may be implemented by hardware, software, firmware, middleware, microcode, or a combination thereof. For hardware implementation, the processing unit may be implemented in one or more application specific integrated circuits (ASICs), a digital signal processing (DSP) unit, a digital signal processing device (DSPD), a programmable logic device (PLD), a field-programmable gate array (FPGA), a universal processor, a controller, a microcontroller, a microprocessor, other electronic units configured to perform the functions described in the present application, or a combination thereof.

For software implementation, the technologies described in the embodiments of this application may be implemented by a module (for example, a process, a function, or the like) that performs the function described in the embodiments of this application. The software code may be stored in the memory and executed by the processor. The memory may be implemented in the processor or outside the processor.

It should be noted that the term "include", "comprise" or any other variation thereof in this specification is intended to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented through software and a necessary general hardware platform, and certainly, may also be implemented by hardware, but in many cases, the former manner is a better implementation. Based on such an understanding, the technical solutions of the present application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present application.

The embodiments of the present application are described above with reference to the accompanying drawings. However, the present application is not limited to the foregoing specific implementations. The foregoing specific implementations are illustrative instead of limitative. Enlightened by the present application, a person of ordinary skill in the art can make many forms without departing from the idea of the present application and the scope of protection of the claims. All of the forms fall within the protection of the present application.

What is claimed is:

1. A downlink data processing method, applied to a terminal, the method comprising:

receiving predetermined downlink data, wherein the downlink data comprises small data received through a message 4 (Msg4) of a 4-step random access process, or small data received through a message B (MsgB) of a 2-step random access process; and verifying the downlink data and processing the downlink data based on a verification result;

wherein the verifying the downlink data and processing the downlink data based on the verification result comprises:

performing contention resolution verification on the downlink data and processing the downlink data based on a contention resolution verification result;

wherein the performing the contention resolution verification on the downlink data and processing the downlink data based on the contention resolution verification result comprises:

in a case that the contention resolution verification of the downlink data succeeds, processing data content of the downlink data by a high layer protocol entity of the terminal; wherein success of MsgB contention resolution verification comprises: user equipment (UE) contention resolution identity information in a successRAR of the MsgB matches first 48 bits of an uplink common control channel (UL CCCH) service data unit (SDU) sent by the terminal; and success of Msg4 contention resolution verification comprises: UE contention resolution identity information in received UE contention resolution identity media access control layer control element (MAC CE) matches the first 48 bits of the UL CCCH SDU sent by the terminal.

2. The method according to claim 1, wherein a data type of the downlink data comprises at least one of the following:

data radio bearer (DRB) data; or signaling radio bearer (SRB) data.

3. The method according to claim 1, wherein status of the terminal comprises any of the following:

an idle state; or an inactive state.

4. The method according to claim 1, wherein the verifying the downlink data and processing the downlink data based on the verification result further comprises:

in a case that the downlink data comprises both signaling radio bearer (SRB) data and data radio bearer (DRB)

data, performing verification processing on the SRB data or the DRB data in the downlink data and processing the downlink data based on a verification processing result.

5. The method according to claim 1, wherein the performing the contention resolution verification on the downlink data and processing the downlink data based on the contention resolution verification result further comprises:

in a case that the contention resolution verification of the downlink data fails, ignoring a current failure;

or sending the data content of the downlink data to the high layer protocol entity for processing, and performing the contention resolution verification on the downlink data; and in a case that the high layer protocol entity of the terminal fails to process the data content of the downlink data and the contention resolution verification performed on the downlink data also fails, ignoring the current failure result.

6. The method according to claim 1, wherein before the processing the data content of the downlink data by the high layer protocol entity of the terminal, the method further comprises:

after the contention resolution verification of the downlink data succeeds, sending the data content of the downlink data to the high layer protocol entity; or before the performing the contention resolution verification on the downlink data, sending the data content of the downlink data to the high layer protocol entity.

7. The method according to claim 5, wherein the ignoring the current failure result comprises at least one of the following:

discarding a data packet of the downlink data; or skipping performing a failure recovery process.

8. The method according to claim 1, wherein the processing the data content of the downlink data comprises at least one of the following:

performing integrity protection verification on the data content of the downlink data;

decrypting the data content of the downlink data; or decompressing the data content of the downlink data.

9. The method according to claim 4, wherein the performing verification processing on the SRB data or the DRB data in the downlink data and processing the downlink data based on the verification processing result comprises:

in a case that verification processing on a first data type data in the downlink data succeeds, performing verification processing on a second data type data in the downlink data, wherein the first data type data is the SRB data and the second data type data is the DRB data; or, the first data type data is the DRB data and the second data type data is the SRB data.

10. The method according to claim 9, wherein in a case that the verification processing on the first data type data in the downlink data fails, a failure recovery process is performed.

11. The method according to claim 10, wherein the verification processing performed on the first data type data comprises at least one of the following:

performing integrity protection verification on the first data type data; or decrypting the first data type data.

12. The method according to claim 10, wherein performing the failure recovery process comprises at least one of the following:

the terminal entering the idle state;

discarding a data packet of the first data type data on which the discarding processing fails;

discarding a data packet of the downlink data;

triggering a cell selection or reselection process;

triggering a connection re-establishment process or a connection establishment process; or falling back context information or configuration information saved by the terminal to a preset state, wherein the preset state is a state before uplink data corresponding to the downlink data is sent.

13. A terminal, comprising a memory, a processor, and a program or instructions stored in the memory and executable on the processor, wherein the program or instructions, when executed by the processor, cause the terminal to perform:

receiving predetermined downlink data, wherein the downlink data comprises small data received through a message 4 (Msg4) of a 4-step random access process, or small data received through a message B (MsgB) of a 2-step random access process; and verifying the downlink data and processing the downlink data based on a verification result;

wherein the program or instructions, when executed by the processor, cause the terminal to perform:

performing contention resolution verification on the downlink data and processing the downlink data based on a contention resolution verification result;

wherein the program or instructions, when executed by the processor, cause the terminal to perform:

in a case that the contention resolution verification of the downlink data succeeds, processing data content of the downlink data by a high layer protocol entity of the terminal; wherein success of MsgB contention resolution verification comprises: user equipment (UE) contention resolution identity information in a successRAR of the MsgB matches first 48 bits of an uplink common control channel (UL CCCH) service data unit (SDU) sent by the terminal; and success of Msg4 contention resolution verification comprises: UE contention resolution identity information in received UE contention resolution identity media access control layer control element (MAC CE) matches the first 48 bits of the UL CCCH SDU sent by the terminal.

14. The terminal according to claim 13, wherein a data type of the downlink data comprises at least one of the following:

data radio bearer (DRB) data; or signaling radio bearer (SRB) data.

15. The terminal according to claim 13, wherein the program or instructions, when executed by the processor, cause the terminal to further perform:

in a case that the downlink data comprises both signaling radio bearer (SRB) data and data radio bearer (DRB) data, performing verification processing on the SRB data or the DRB data in the downlink data and processing the downlink data based on a verification processing result.

16. The terminal according to claim 13, wherein the program or instructions, when executed by the processor, cause the terminal to perform:

in a case that the contention resolution verification of the downlink data fails, ignoring a current failure;

or sending the data content of the downlink data to the high layer protocol entity for processing, and performing the contention resolution verification on the downlink data;

and in a case that the high layer protocol entity of the terminal fails to process the data content of the downlink data and the contention resolution verification performed on the downlink data also fails, ignoring the current failure result.

17. The terminal according to claim 15, wherein the program or instructions, when executed by the processor, cause the terminal to perform:

in a case that verification processing on a first data type data in the downlink data succeeds, performing verification processing on a second data type data in the downlink data, wherein the first data type data is the SRB data and the second data type data is the DRB data; or, the first data type data is the DRB data and the second data type data is the SRB data.

18. A non-transitory readable storage medium, storing a program or instructions, wherein the program or instructions, when executed by a processor of a terminal, cause the terminal to perform:

receiving predetermined downlink data, wherein the downlink data comprises small data received through a message 4 (Msg4) of a 4-step random access process, or small data received through a message B (MsgB) of a 2-step random access process; and verifying the downlink data and processing the downlink data based on a verification result;

wherein the program or instructions, when executed by the processor, cause the terminal to perform:

performing contention resolution verification on the downlink data and processing the downlink data based on a contention resolution verification result;

wherein the program or instructions, when executed by the processor, cause the terminal to perform:

in a case that the contention resolution verification of the downlink data succeeds, processing data content of the downlink data by a high layer protocol entity of the terminal; wherein success of MsgB contention resolution verification comprises: user equipment (UE) contention resolution identity information in a successRAR of the MsgB matches first 48 bits of an uplink common control channel (UL CCCH) service data unit (SDU) sent by the terminal; and success of Msg4 contention resolution verification comprises: UE contention resolution identity information in received UE contention resolution identity media access control layer control element (MAC CE) matches the first 48 bits of the UL CCCH SDU sent by the terminal.

19. The non-transitory readable storage medium according to claim 18, wherein a data type of the downlink data comprises at least one of the following:

data radio bearer (DRB) data; or signaling radio bearer (SRB) data.

20. The non-transitory readable storage medium according to claim 18, wherein the program or instructions, when executed by the processor, cause the terminal to further perform:

in a case that the downlink data comprises both signaling radio bearer (SRB) data and data radio bearer (DRB) data, performing verification processing on the SRB data or the DRB data in the downlink data and processing the downlink data based on a verification processing result.

* * * * *